(12) United States Patent
Mikota et al.

(10) Patent No.: US 11,092,258 B2
(45) Date of Patent: Aug. 17, 2021

(54) PIEZOELECTRICALLY ACTUATED QUICK-ACTION HYDRAULIC VALVE

(71) Applicant: Primetals Technologies Austria GmbH, Linz (AT)

(72) Inventors: Gudrun Mikota, Gallneukirchen (AT); Josef Mikota, Gallneukirchen (AT)

(73) Assignee: PRIMETALS TECHNOLOGIES AUSTRIA GMBH

(*) Notice: Subject to any disclaimer, the term of this patent is extended or adjusted under 35 U.S.C. 154(b) by 188 days.

(21) Appl. No.: 16/091,393

(22) PCT Filed: Mar. 16, 2017

(86) PCT No.: PCT/EP2017/056267
§ 371 (c)(1),
(2) Date: Oct. 4, 2018

(87) PCT Pub. No.: WO2017/182202
PCT Pub. Date: Oct. 26, 2017

(65) Prior Publication Data
US 2019/0154164 A1 May 23, 2019

(30) Foreign Application Priority Data
Apr. 19, 2016 (EP) .................................. 16165928

(51) Int. Cl.
*F16K 31/00* (2006.01)
*F16K 31/08* (2006.01)
(Continued)

(52) U.S. Cl.
CPC ........ *F16K 31/007* (2013.01); *F16K 27/0236* (2013.01); *F16K 31/082* (2013.01); *F16K 31/10* (2013.01)

(58) Field of Classification Search
CPC ......... F16K 31/007–008; F16K 31/082; F16K 31/10; F16K 27/0236; F16K 31/126; (Continued)

(56) References Cited

U.S. PATENT DOCUMENTS 5,417,142 A * 5/1995 Lohmann ................ F16K 31/02
137/625.65
5,697,554 A 12/1997 Auwaerter et al. ............. 239/88
(Continued)

FOREIGN PATENT DOCUMENTS

CN 1133941 A 10/1996
CN 101493153 A 7/2009
(Continued)

OTHER PUBLICATIONS

International Search Report dated Jun. 7, 2017 in corresponding PCT International Application No. PCT/EP2017/056267.
(Continued)

*Primary Examiner* — Marina A Tietjen
(74) *Attorney, Agent, or Firm* — Ostrolenk Faber LLP

(57) ABSTRACT

A hydraulic valve (3) includes an actuation device (1, 1*a*, 1*b*) for a control piston (2). The valve (3) is simple, robust, and insensitive to dirt. The is an actuation device (1, 1*a*, 1*b*) has a flexurally rigid metal plate (5), with an outer region fixed to the housing (4) in a stationary manner. A piezoelectric actuator (6) can bend a central region of the metal plate (5); and a pressure chamber (7) is filled with a pressurized liquid during operation. The pressure chamber (7) is delimited by the housing (4), the metal plate (5), and the control piston (2). The metal plate (5) seals the pressure chamber (7), and the pressure chamber (7) acts on the control piston (2). A surface area AP of the metal plate (5) over the pressure chamber (7) is larger than the cross-sectional area $A_K$ of the control piston (2).

18 Claims, 9 Drawing Sheets

(51) Int. Cl.
*F16K 31/10* (2006.01)
*F16K 27/02* (2006.01)

(58) Field of Classification Search
CPC ...... F16K 31/163; F16K 31/165; F16K 31/12; F04B 43/02; F04B 43/046
USPC .......................... 251/57, 129.06; 137/625.65
See application file for complete search history.

(56) References Cited

U.S. PATENT DOCUMENTS

| | | | |
|---|---|---|---|
| 5,875,764 | A | 3/1999 | Kappel et al. ................ 123/467 |
| 6,062,532 | A | 5/2000 | Gürich et al. .................. 251/57 |
| 6,076,800 | A | 6/2000 | Heinz et al. ............. 251/129.06 |
| 6,154,000 | A | 11/2000 | Rastegar et al. .............. 318/632 |
| 6,424,078 | B1 | 7/2002 | Heinz ........................... 310/328 |
| 2002/0178902 | A1 | 12/2002 | Trzmiel et al. ................ 91/459 |
| 2004/0041111 | A1* | 3/2004 | Boecking ........... F02M 63/0026 251/129.06 |
| 2009/0311116 | A1 | 12/2009 | Bai et al. .................... 417/413.2 |
| 2013/0068200 | A1 | 3/2013 | Reynolds et al. ............ 123/472 |

FOREIGN PATENT DOCUMENTS

| | | |
|---|---|---|
| CN | 102192135 A | 9/2011 |
| CN | 102996838 A | 3/2013 |
| DE | 88 01 009 U1 | 4/1988 |
| DE | 44 07 962 C1 | 6/1995 |
| DE | 20206161 U1 * | 9/2003 |
| EP | 1 229 264 A2 | 8/2002 |
| RU | 2193683 C2 | 11/2002 |
| RU | 2228477 C2 | 5/2004 |
| WO | WO 99/58840 A1 | 11/1999 |

OTHER PUBLICATIONS

Written Opinion dated Jun. 7, 2017 in corresponding PCT International Application No. PCT/EP2017/056267.
Extended European Search Report dated Nov. 11, 2016 in corresponding European Patent Application No. 16165928.9.
N. Herakovic,"Piezoaktorbetätigung für ein einstufiges hochdynamisches Servoventil," Oelhydraulik und Pneumatik vol. 39, pp. 601-605, Aug. 1995, (DE); XP00051598; ISSN: 0341-2660, (see ISR for relevance).
N. Matten et al., "Stetigwirkendes Wegeventil mit piezoaktuatorischem Stellelement," Oelhydraulik und Pneumatik, vol. 38, pp. 350, 352, 354-355, 1997; XP000195279; ISSN: 0341-2660, (see ISR for relevance).
G. Wennmacher et al., "Prototyp eines dynamischen Schnellschaltventiles mit piezoelektrischer Ansteuerung," Oelhydraulik und Pneumatik, vol. 37, pp. 794-797, 1993; XP000195248; ISSN: 0341-2660, (see ISR for relevance).
A. Hitchcox, "Piezo actuators: The future of servovalves?", Hydraulics & Pneumatics, 3 pages, 2005, URL: http://hydraulicspneumatics.com/200/TechZone/HydraulicValves/Article/False/12852/TechZone-HydraulicValves; download date: Feb. 12, 2016.
J. Edler et al., "Investigation of a Servo Valve with a Piezoelectric Pilot Stage," Fluid Power 2015, 9 pages.
"Druck in Anlagensystem (allgemein)," URL: enhttp://www.ikz.de/ikz-praxis-archiv/p0405/040512.php); download date: Sep. 25, 2018.
Office Action and Search Report dated Jul. 1, 2019 in corresponding Russian Patent Application No. 2018136741/06(060807).
Office Action dated Jul. 22, 2019 in corresponding Chinese Patent Application No. 201780024838.6.

* cited by examiner

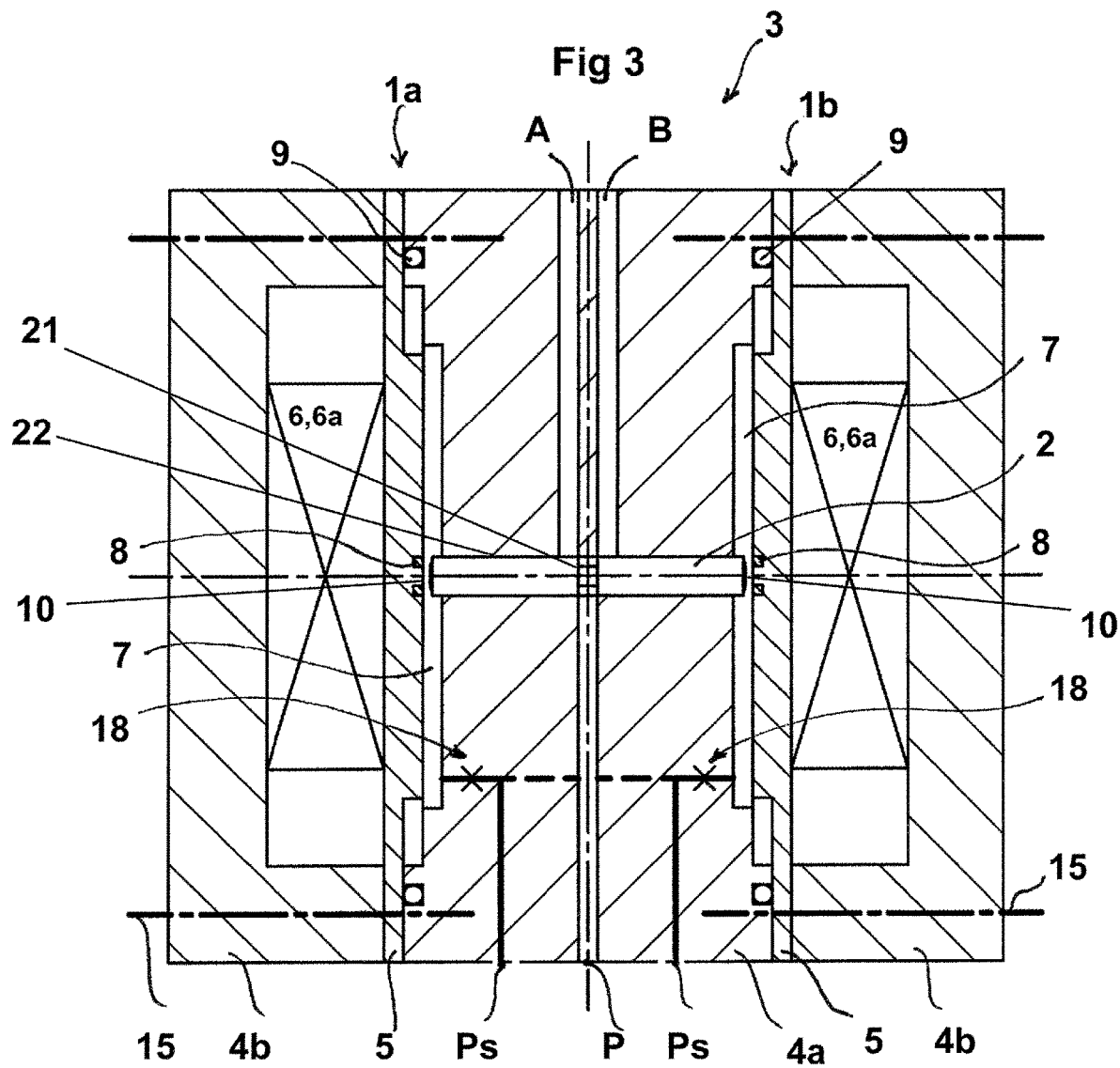

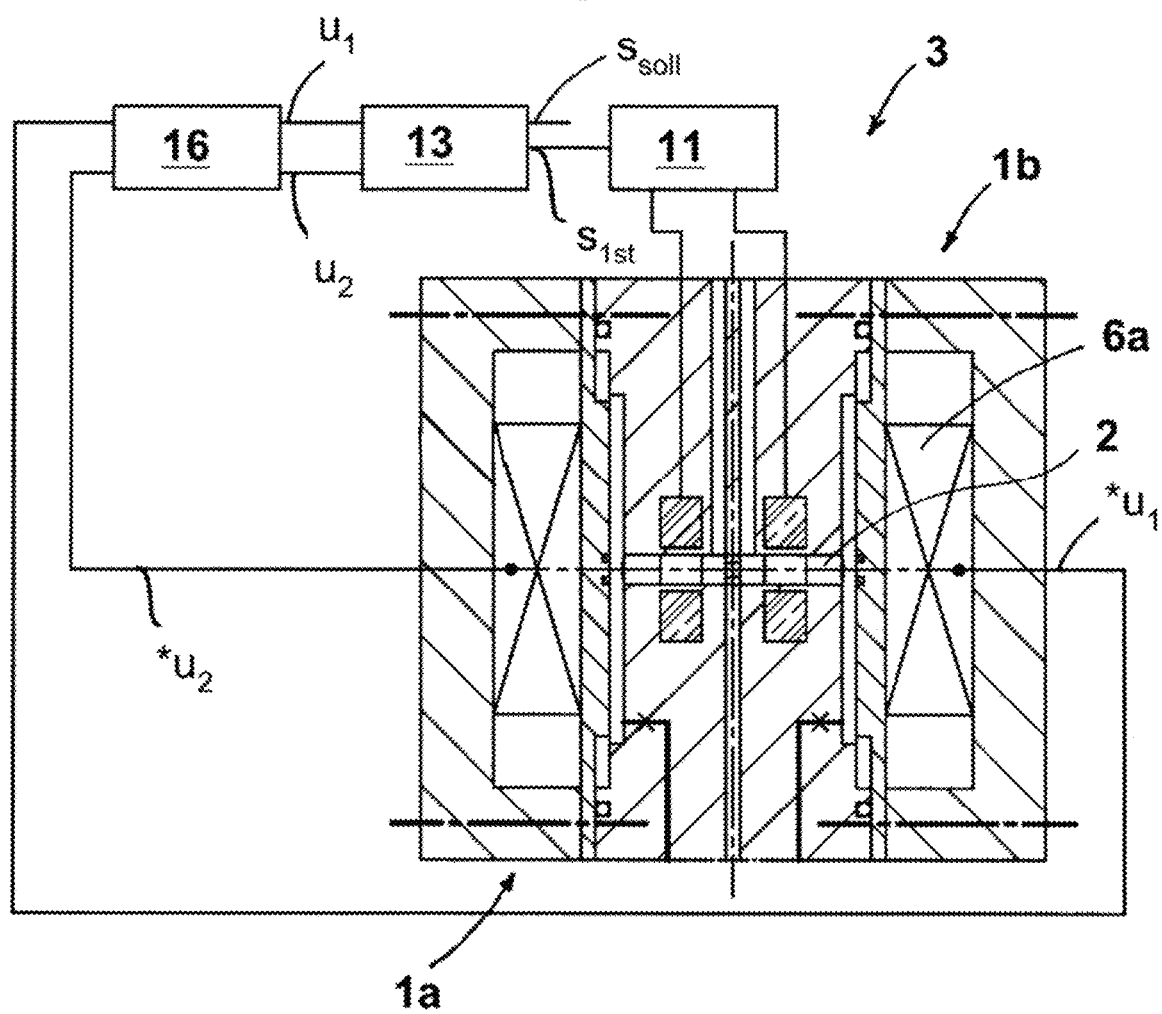

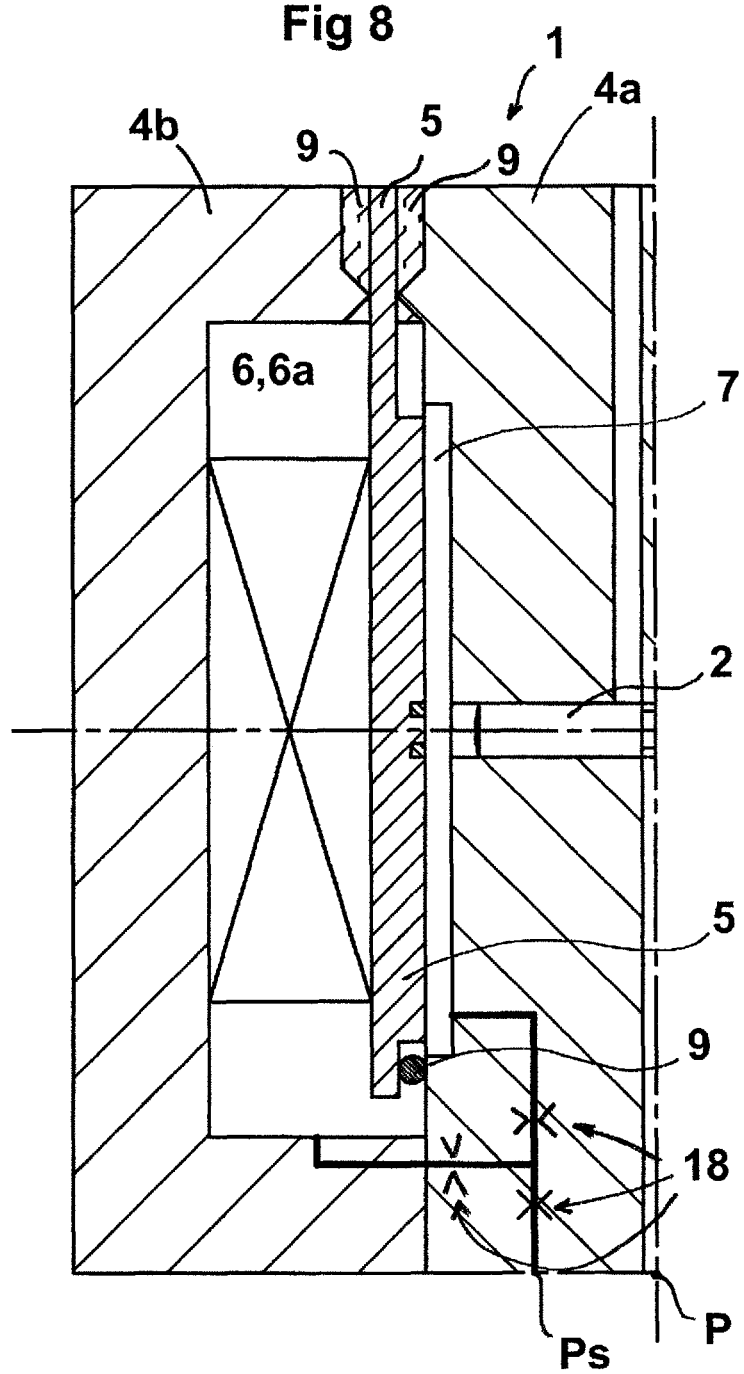

PIEZOELECTRICALLY ACTUATED QUICK-ACTION HYDRAULIC VALVE

CROSS-REFERENCE TO RELATED APPLICATIONS

The present application is a 35 U.S.C. §§ 371 national phase conversion of PCT/EP2017/056267, filed Mar. 16, 2017, which claims priority of European Patent Application No. 16165928.9, filed Apr. 19, 2016, the contents of which are incorporated by reference herein. The PCT International Application was published in the German language.

TECHNICAL FIELD

The present invention relates to the technical field of hydraulics. In that field, hydraulic valves are used in a variety of ways, for example for controlling or regulating hydraulic drives, such as linearly moving hydraulic cylinders or rotating hydraulic motors, or in the so-called secondary cooling of a continuous casting machine for opening, closing or setting cooling agent flows.

TECHNICAL BACKGROUND

Specifically, the invention relates to a quick-action hydraulic valve having an actuating device for a control piston, wherein the hydraulic valve comprises
a housing,
the control piston has a cross-sectional area $A_K$, and the control piston is able to be displaced in the housing in the axial direction, so that a throughflow of a pressurized liquid is able to be set by displacement of the control piston, and
at least one actuating device for displacing the control piston.

The displacement of the control piston in the axial direction causes the throughflow of a pressurized liquid (for example hydraulic oil, cooling agent or water) through the hydraulic valve to be opened or closed, or the throughflow or the pressure of the pressurized liquid is set to a particular value. On the one hand, the actuation of the actuating device allows a hydraulic drive to be activated or deactivated or a speed, which corresponds to the throughflow of the pressurized liquid through the hydraulic valve, to be set. On the other hand, it is possible via the throughflow of the pressurized liquid through the hydraulic valve, for the cooling, for example in a rolling mill or in the secondary cooling of a continuous casting machine, to be activated or deactivated in a targeted manner or for the cooling capacity, the volume flow or the pressure of the pressurized liquid to be set to a particular target value. Here, the setting is realized either in a discontinuous or switching manner, for example by periodic activation and deactivation of the volume flow, or in a continuous manner, wherein the actuating device moves the control piston of the hydraulic valve to a predetermined position.

PRIOR ART

A wide variety of hydraulic valves having actuating devices are already known in the prior art. Their control piston is actuated either directly or indirectly (or in a pilot-controlled manner) by the actuating devices.

According to the prior art, continuous hydraulic valves which act particularly quickly are generally designed in the form of so-called single- or multi-stage servo valves. In this case, the control piston is actuated indirectly (or in a pilot-controlled manner) by at least one actuating device which is formed as a servo pilot stage. In quick-action, discontinuous hydraulic valves (referred to as switching valves for short), the control piston is actuated directly by an actuating device with at least one proportional or regulating magnet.

Servo valves are very complicated owing to the great technical complexity of the servo pilot stage. Moreover, they are sensitive to dirt, are of low robustness and are expensive. Finally, the control or regulation of a servo valve is difficult and, in terms of regulation technology, cumbersome owing to the pronounced nonlinearities of the servo pilot stage (especially as a result of the nozzle-impact plate principle).

Compared with servo valves, the direct actuation of continuous hydraulic valves by actuating devices with proportional or regulating magnets (the hydraulic valves are referred to as proportional or regulating valves for short) or actuation of discontinuous switching valves with magnets is significantly easier, involves less sensitivity to dirt, is more robust and is less expensive. A disadvantage, however, is that hydraulic valves having a throughflow of 50 l/min at a pressure drop of 5 bar and having a switching time<10 ms are not able to be realized easily in this way.

Also known in the prior art are hydraulic valves which comprise an actuating device having a piezoelectric actuator. Although piezoelectric actuators (for example piezoceramics) are able to react quickly and to apply large forces, a disadvantage is that these actuators are able to realize only extremely small strokes or deflections. Also, the use of so-called piezo stacks, for example an arrangement of multiple piezoelectric actuators one above the other, for the realization of larger strokes or deflections leads to problems during the practical application, especially since even these strokes are not sufficient for a control piston in a normal situation.

A hydraulic valve having a piezoelectric actuator for actuating a control piston is known from the publication
Alan Hitchcox "Piezo actuators: The future of servo-valves?", Hydraulics & Pneumatics, 2005 (see http://hydraulicspneumatics.com/200/TechZone/Hydraulic-Valves/Article/False/12852/TechZone-HydraulicValves).

A way in which the extremely small travel of the piezoelectric actuator can be increased does not emerge from the publication.

Also, a servo valve having a piezoelectric actuator is known from the publication
Jörg Edler et al. "Investigation of a Servo Valve with a Piezoelectric Pilot Stage", Fluid Power 2015.

Due to the servo pilot stage, the servo valve is very complex, sensitive to dirt and expensive.

WO 99/58840 A1 discloses a hydraulic valve having an actuating device 5, wherein the hydraulic valve comprises a housing 1, an axially displaceable control piston 14 and an actuating device 5. The actuating device 5 has a piezoelectric actuator 12, a pressure piston 11 with a restoring element 13 and with a seal 18, and also a hydraulic chamber 2 which is filled with a fluid 6. The pressure piston 11 is displaced in the axial direction by the piezoelectric actuator 12. The piston is sealed off with respect to the housing 1 by a separate seal 18. The pressure piston is brought back into its initial position by the restoring element 13. The cross-sectional area of the pressure piston 11 is greater than the cross-sectional area of the control piston 14, so that the displacement of the control piston 14 is greater than the expansion of the piezoelectric actuator 12. A disadvantage of this solution is that the pressure piston 11 is heavy and that piston has to be sealed off via a separate seal 18. Since that seal is a dissipative element owing to the friction between the moving pressure piston and the housing, this has a negative effect on the dynamics of the hydraulic valve. Moreover, the masses of the pressure piston 11 and the control piston 14 are large, and this likewise limits the speed of the hydraulic valve. In addition, the seal 18 is subject to wear, which reduces the service life of the hydraulic valve. A way in which the maximum dynamics of the hydraulic valve can be increased and the reliability of said valve can be improved does not emerge from the document.

A hydraulic travel multiplier for a piezoelectrically actuated hydraulic valve is known from the publication HERAKOVIC N: "PIEZOAKTORBETÄTIGUNG FÜR EIN EINSTUFIGES HOCHDYNAMISCHES SERVOVENTIL" ["PIEZO ACTUATOR ACTUATION FOR A SINGLE-STAGE, HIGHLY DYNAMIC SERVO VALVE"], O&P—OELHYDRAULIK UND PNEUMATIK, Vol. 39, No. 8, 1 Aug. 1995, pages 601-605.

Since this travel multiplier uses a diaphragm, it is necessary for the maximum operating pressure of the hydraulic valve to be limited to approximately 50 bar. That solution is consequently not suitable, however, for hydraulic valves in the medium-pressure or high-pressure range.

U.S. Pat. No. 6,062,532 also discloses a hydraulic valve which makes use of a hydraulic travel multiplier having a diaphragm. This solution too is not suitable for hydraulic valves in the medium-pressure or high-pressure range, owing to the diaphragm.

A hydraulic valve having a diaphragm for use in the sanitary sector is known from DE 8801009 U1. Since the maximum operating pressure in the sanitary sector is only a few bar (see http://www.ikz.de/ikz-praxis-archiv/p0405/040512.php), the hydraulic valve is not suitable for the medium-pressure or high-pressure range. Moreover, the hydraulic valve is not able to realize quick switching times≤10 ms.

Consequently, the hydraulic valves according to the prior art, limits are reached. However, for certain applications (for example for actuating a hydraulic valve for the purpose of suppressing or compensating for chatter vibrations in a rolling mill), only quick-action medium-pressure or high-pressure hydraulic valves, having a throughflow≥50 l/min at a pressure drop of 5 bar and having a switching time≤2 ms, can be used. It is currently necessary to continue to use servo valves having a nozzle-impact plate actuating device and to accept many disadvantages with regard to price, sensitivity to dirt and nonlinearity of the actuation.

SUMMARY OF THE INVENTION

In summary, there is therefore a need for a simple hydraulic valve which is suitable for use in the medium-pressure or high-pressure range and is able to react quickly (switching time≤2 ms), but does not have the aforementioned disadvantages with regard to price, robustness, sensitivity to dirt and nonlinearity of the actuation.

It is the object of the invention to overcome the disadvantages of the prior art and to provide a quick-action hydraulic valve for the medium-pressure range (pressures of between 100 and 200 bar) or high-pressure range (pressures of above 200 to approximately 500 bar) having a throughflow≥50 l/min at a pressure drop of ≤5 bar. The hydraulic valve is intended to have a switching time≤2 ms, enabling the control piston of the hydraulic valve to be displaced from a first end position (for example of a closed position) into a second end position (for example of a fully open position). The actuation of the hydraulic valve is intended to be significantly more linear in comparison with that of servo valves. Moreover, the hydraulic valve is intended to be easier, more expedient, more robust and more insensitive to dirt in comparison with the prior art.

This object is achieved by a hydraulic valve of the type mentioned in the introduction, wherein the actuating device of the hydraulic valve has a flexurally rigid metal plate having an outer region that is fixed to the housing in a stationary manner;

a piezoelectric actuator, which is able to bend a central region of the metal plate; and a pressure chamber, which is filled with pressurized liquid during operation, wherein the pressure chamber is delimited by the housing, the metal plate and a control piston, wherein the metal plate seals off the pressure chamber and the pressure chamber acts on the control piston, and wherein an area $A_P$ of the metal plate over the pressure chamber is greater than the cross-sectional area $A_K$ of the control piston.

For example, hydraulic valves having a throughflow greater than or equal to 50 l/min at a pressure drop of less than or equal to 5 bar and having a switching time of less than or equal to 2 ms are intended to be covered by the invention. Thus, for example, hydraulic valves having a throughflow<50 l/min (for example injection valves for injecting a fuel into an internal combustion engine) are not covered by the scope of protection of the invention, even if these have a switching time≤2 ms.

The hydraulic valve according to the invention having the actuating device achieves the object in that a piezoelectric actuator (piezo element or piezo for short) is able to bend the central region of a flexurally rigid metal plate. For this purpose, the piezoelectric actuator is preferably arranged in line with the axis of symmetry of the metal plate (in the case of a circular metal plate, thus collinear with respect to the center point). The piezoelectric actuator is electrically energized, with the result that the actuator expands in the axial direction. The metal plate separates the chamber, in which the piezo is arranged, from the pressure chamber, which is filled with the pressurized liquid (for example a hydraulic fluid, a cooling agent or water), and seals off the pressure chamber in a fluid-tight manner. The chamber in which the piezo element itself is arranged may either be filled with pressurized liquid ("wet") or be "dry". The bending of the flexurally rigid metal plate results in bending stresses in the elastic region of the metal plate and also in a pressure p being built up in the pressure chamber. Since the pressure chamber acts on the control piston, the control piston is displaced by the force $F=p \cdot A_K$, where $A_K$ is the cross-sectional area of the control piston. In order for a displacement of the control piston greater than the axial expansion of the piezo element to be realized, the area $A_P$ of the metal plate over the pressure chamber is greater than the cross-sectional area $A_K$ of the control piston. In this way, the control piston is displaced with a "hydraulic travel amplification" owing to the constancy of volume which holds for the pressure chamber. The factor for the hydraulic travel amplification corresponds, in a simplified form, to the ratio between the area $A_P$ of the metal plate over the pressure chamber and the cross-sectional area $A_K$ of the control piston. In the case of an area ratio of, for example, 64, the control piston of the valve is displaced approximately 64 times as far as the piezo element expands in the axial direction, that is, a "hydraulic travel amplification" of 64 is applied here.

For the purpose of supporting the metal plate, its outer region is fixed to the housing in a stationary manner. Consequently, on the outer region of the metal plate, at least the three displacement degrees of freedom (these being the radial, the tangential and the axial displacement in a cylindrical coordinate system) are blocked. If the metal plate is braced, the rotation degrees of freedom are additionally blocked. It is preferable for the entire circumference of the outer region of the metal plate to be fixed in a stationary manner, and for the region within the outer region of the metal plate to be able to be bent freely.

Within the context of technical mechanics, the flexurally rigid metal plate is a flexurally rigid metallic plate, that is, a "flat" plate-shaped mechanical element which has significantly high (that is to say non-negligible) flexural rigidity. If a plate is bent, a bending-stress state is realized. As is known, the bending stresses in the plate are not constant over the thickness of the plate since there are inter alia a tensile fiber, a compressive fiber and a neutral fiber. By contrast, the flexural rigidity of a diaphragm is negligibly small. A diaphragm cannot absorb any bending load and the stresses are assumed to be constant over the thickness of the diaphragm. In this case, a diaphragm stress state is spoken of in technical mechanics. It is precisely the case, however, that the metal plate according to the invention is not a diaphragm since this would not be able to permanently withstand the large hydraulic forces arising in the pressure chamber during the operation.

The hydraulic valve according to the invention has only a few movable parts and is thus simple and cost-effective. Since the hydraulic valve deliberately avoids narrow gaps, it is also insensitive to dirt and robust. The use of a metal plate instead of a diaphragm allows the hydraulic valve to be used in the medium-pressure or high-pressure range without restriction.

Moreover, the control piston can be formed in a simple and lightweight manner, which makes short switching times≤2 ms and high dynamics possible. A separate pressure piston, as in WO 99/58840, is not required. Moreover, a pressure-tight fixing (for example a bracing) of the metal plate or an additional seal between the outer region of the metal plate and the housing for sealing off the pressure chamber does not reduce the dynamics of the hydraulic valve. Since both the piezoelectric actuator and the metal plate behave highly linearly, the hydraulic valve behaves significantly more linearly than servo valves of comparable speed.

Preferably, the metal plate is designed in one piece since, in this way, no sealing within the metal plate is necessary.

For the purpose of achieving large displacements of the control piston, it is advantageous if the area of the metal plate over the pressure chamber, $A_P$, is at least 4 times, at least 16 times, at least 36 times or at least 64 times greater than the cross-sectional area of the control piston, $A_K$. Even greater area ratios are also able to be realized without any problems and are limited only by the maximum force of the piezo.

The piezoelectric actuator may be formed for example as a piezoelectric stack, enabling the displacement of the control piston to be further increased.

In particular for control or regulation technology reasons, it is advantageous if the piezoelectric actuator has a travel measurement system for measuring an expansion of the piezoelectric actuator in the axial direction x. Here, the travel measurement function may either already be integrated in the piezo element or be realized by an external measurement system.

It is expedient if the metal plate is thicker in the central region than in the outer region. In this way, the metal plate is more flexible in the outer region than in the central region, and so the force for the bending of the metal plate is reduced. On the other hand, a thicker central region ensures that the bending of the metal plate by the piezo element is kept relatively constant over a large region.

A long service life of the metal plate or the actuating device is achieved if the metal plate consists of steel, preferably spring steel.

For a given force, a large degree of bending is achieved if the metal plate is designed to be round, preferably circular.

The position of the control piston in the so-called end positions can be easily fixed if the central region of the metal plate has a holding magnet. The position of a ferromagnetic control piston is, in a manner substantially independent of flow forces, fixed in an end position as a result of the holding magnet (preferably a permanent magnet, although an electromagnet would also be possible). On the one hand, this embodiment contributes to energy saving since the piezo element has to be electrically energized only during a change of state (for example during the transfer from one end position into another end position). The control piston is thus bistable in the end positions. On the other hand, it is consequently also possible for the piezo to be designed in a smaller and more compact form since it does not need to be electrically energized constantly.

The pressure chamber can be sealed off with very low leakage, or completely without leakage, if a fluid-tight seal is provided between the outer region of the metal plate and the housing. Unlike the sealing of the pressure piston 11 by means of the seal 18 in WO 99/58840 A1, the seal brings about no reduction in the dynamics at the outer region of the metal plate since the outer region of the metal plate is fixed in a stationary manner in the region of the seal.

For compensation of leakage in the pressure chamber and for pressure equalization between the pressure chamber and the pressure supply, it is particularly advantageous if a line, which preferably has an orifice, connects the pressure chamber to a pressure supply (for example for a control pressure $p_S$ or a system pressure p). It is advantageous at a separate pressure supply with a control pressure $p_S$ that the control pressure is more stable than the system pressure p, and the control pressure $p_S$< the maximum of the system pressure p.

As already stated above, the hydraulic valve according to the invention is not restricted to the hydraulic drive technology. Rather, the hydraulic valves may also be used in metallurgical plants, for example rolling mills, continuous casting installations, . . . , wherein a metal (for example a steel strand in slab form, or a roughed or finished strip) is cooled by cooling nozzles. The setting of the throughflow or of the pressure of the pressurized liquid through one or more cooling nozzles can be realized by a hydraulic valve.

For the purpose of fixing the control piston in an end position, it is expedient if the control piston consists of steel, preferably of a ferromagnetic steel. This embodiment is advantageous in particular if the central region of the metal plate has a holding magnet.

"Sticking" of the end face of the control piston to the metal plate can be prevented if the end face of the control piston has a crowned formation. This also increases the dynamics of the hydraulic valve.

A simple construction of the hydraulic valve is achieved if the housing has a valve block and a cover, wherein the cover is detachably connected to the valve block and the piezoelectric actuator is supported against the cover. The metal plate may be braced between the housing and the cover. This also results in improved ease of maintenance of the hydraulic valve.

For the purpose of regulating the position of the control piston, it is expedient if the valve block has a travel measurement system for measuring a position of the control piston. It is thus possible to dispense with external travel measurement systems outside the valve block. For high dynamics, it is advantageous if the travel measurement system operates in a contactless manner.

Simple and effective actuation of the hydraulic valve is achieved if an amplifier amplifies a control signal and electrically energizes at least one actuator by way of the amplified control signal.

Simple and effective actuation of the hydraulic valve with a regulator and an amplifier is achieved if the regulator calculates a manipulated variable signal u in dependence on a difference between a target position and an actual position of the control piston, and the amplifier electrically energizes at least one actuator by way of the amplified manipulated variable signal.

In both cases, the control or manipulated variable signal is amplified by an amplifier and the sensitive control/regulation is thus separated from the power part of the actuator.

In particular with the regulation, it is additionally possible, by way of the electrical energization of the piezo element, for the temporal expansion of the actuator to be set in a targeted manner. Here, not only the application of a jump, which leads to a rapid axial expansion of the piezo element corresponding to the dynamics of the piezo element, but also any desired profiles, such as for example ramp-shaped, trapezoidal, sinusoidal profiles, etc., are possible.

For a large number of hydraulic valves, for example for a 3/2-way switching or continuous valve or for a 4/3-way switching or continuous valve, it is expedient if the hydraulic valve has two actuating devices, such that the two ends of the control piston are each actuated by one actuating device. This embodiment is also advantageous because no mechanical spring is required for the restoring action on the control piston. Although mechanical springs appear to be simple at first glance, they are subject to wear and, in the case of relatively large spring travels, exhibit pronounced nonlinearities (for example disk springs). This embodiment in turn allows the control piston to be of a smaller and more lightweight design, which improves the dynamics of the hydraulic valve.

BRIEF DESCRIPTION OF THE DRAWINGS

Further advantages and features of the present invention will emerge from the description below of non-restrictive exemplary embodiments, wherein, in the following figures:

FIG. 7 is an illustration showing the regulation of the position of a control piston of a hydraulic valve with two actuating devices, FIG. 8 shows a half-section through a hydraulic valve with two variants of an actuating device.

DESCRIPTION OF THE EMBODIMENTS

Figure 1:
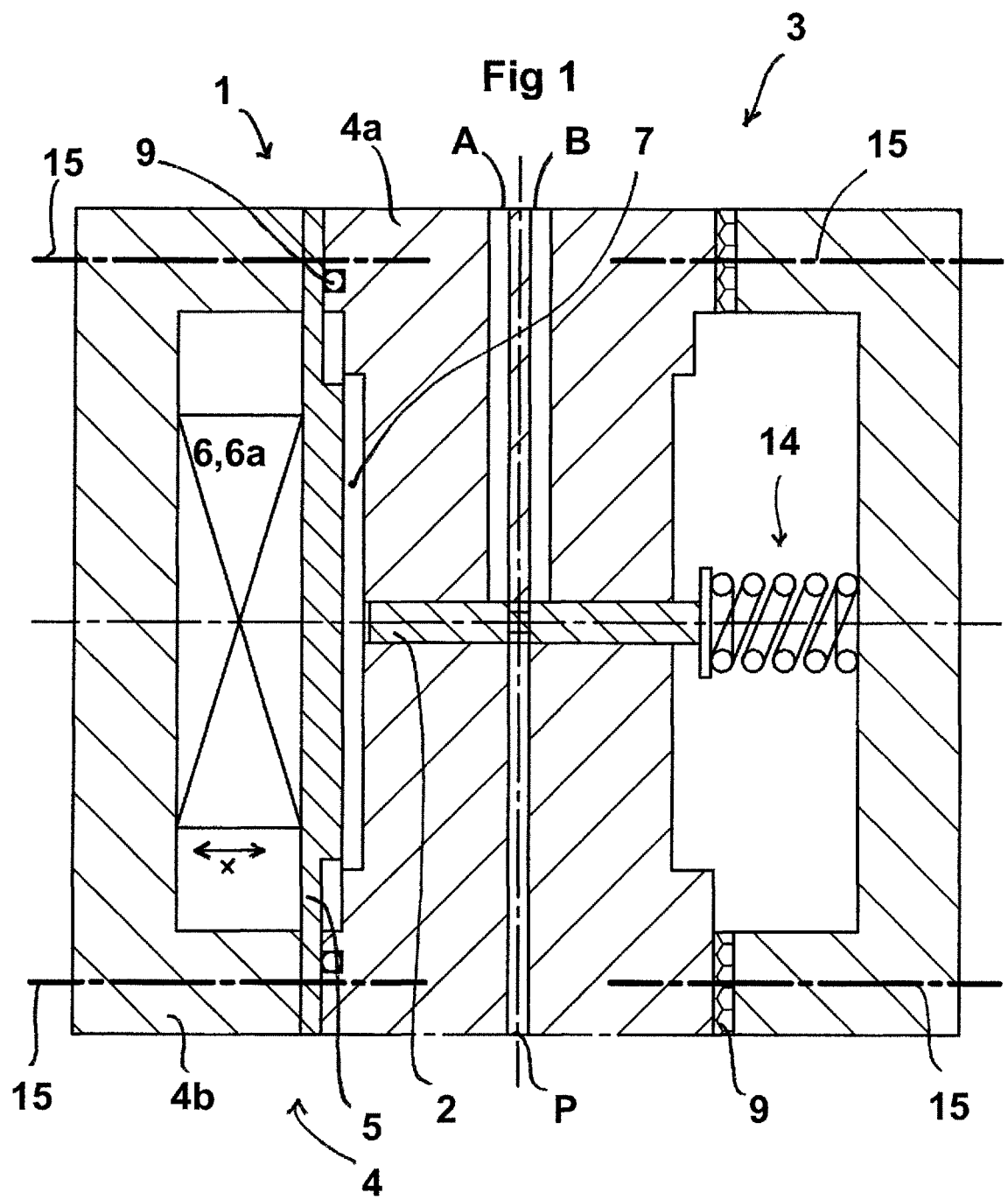
FIG. 1 shows a longitudinal section through a hydraulic valve with an actuating device and a spring.

FIG. 1 shows a 3/2-way hydraulic valve 3 (the digit before the forward slash standing for the number of ports and the digit after the forward slash standing for the number of positions of the hydraulic valve) with an actuating device 1, which is arranged on the left side in the figure. The hydraulic valve 3 operates as a switching valve and has a control piston 2 which is guided displaceably in a bore or cylinder in the valve block 4a of the housing 4. Depending on the position of the control piston 2, the pressure port p of the valve 3 is connected either to the consumer port A or to the consumer port B. The control piston 2 is acted on by the actuating device 1, on the one hand, and a spring 14, on the other hand.

The actuating device 1 has a circular, flexurally rigid metal plate 5 composed of spring steel, which is braced between the valve block 4a and the cover 4b of the housing 4. Both parts of the housing 4 are detachably connected to one another by way of screw connections 15, and so the piezoelectric actuator 6 (piezo for short), the metal plate 5 or even the entire actuating device 1 can be easily replaced.

A piezo 6 configured in the form of a piezo stack 6a is arranged on the left side of the metal plate 5. As a result, the central region of the metal plate 5 can be bent by the piezo. Since the metal plate 5 is thinner in the outer region than in the central region, the necessary force for bending the metal plate is kept low.

Figure 2:
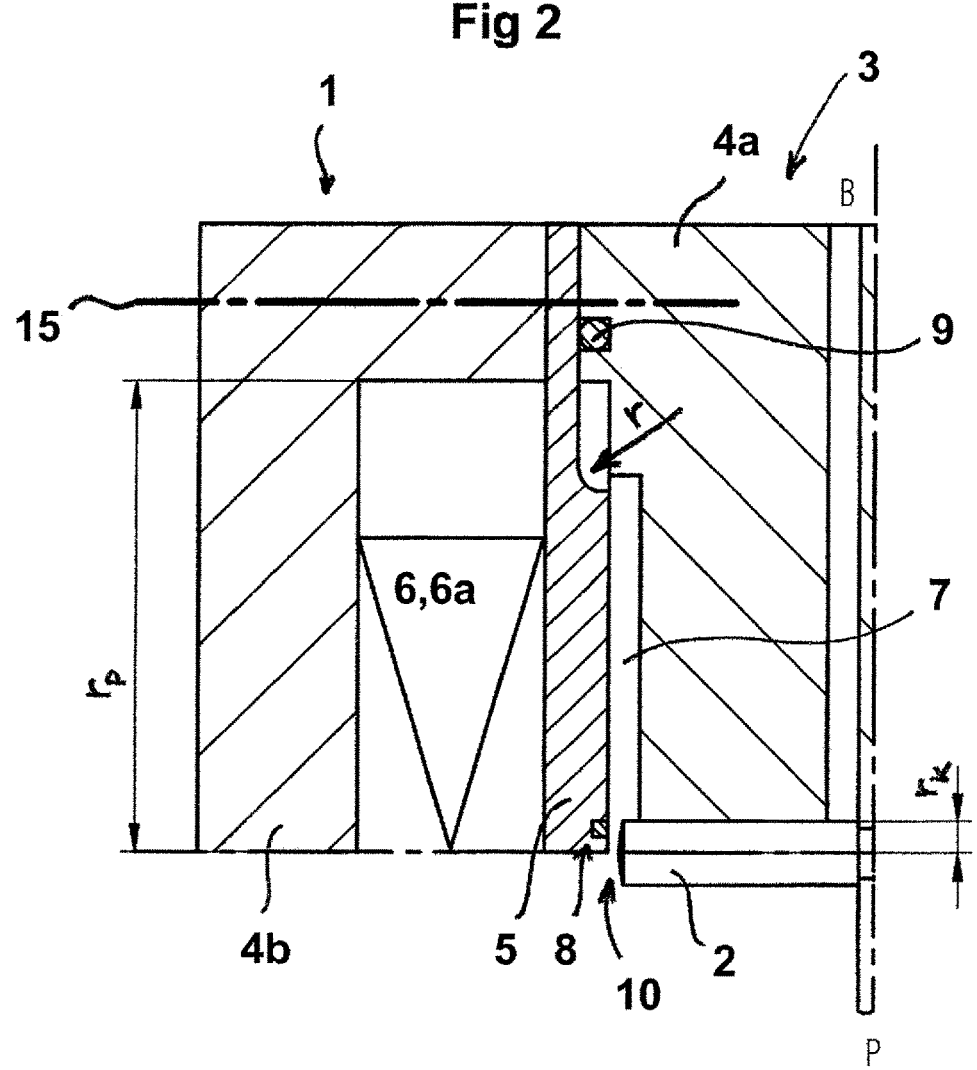
FIG. 2 shows a quarter-section through a first alternative of the hydraulic valve, with an actuating device having a holding magnet.

A pressure chamber 7 is situated on the right side of the metal plate 5. The electrical energization of the piezoelectric actuator 6 results in the piezo expanding in the axial direction x and bending the central region of the metal plate 5. See FIG. 2B. The actual amount of bending of the metal plate is typically small, but enough to increase pressure p in the pressure chamber to move the piston due to the pressure increase. The illustration of the bending of the plate in FIG. 2B is exaggerated to explain the disclosed bending. Since the pressure chamber 7 is filled with a pressurized liquid (hydraulic oil in this case), the pressure p in the pressure chamber 7 increases as a result of the bending of the metal plate 5, which describes a bending curve. The left side of the pressure chamber 7 is sealed off in a fluid-tight manner by the metal plate 5 and a seal 9 which is situated between the metal plate 5 and the valve block 4a. The other sides of the pressure chamber 7 are sealed off in a pressure-tight manner by the valve block 4a of the housing 4. The increased pressure in the chamber 7 due to the bending of the plate increases the pressure in chamber 7 sufficiently so that the end face of the piston is urged to the right in FIG. 2B and in FIG. 3B by the pressure in the chamber 7 at the left in those Figures. Since the pressure chamber 7 acts on the end face of the control piston 2, the control piston 2 is pushed away in the direction of the spring 14 by the force $F=p\cdot A_K$, where $A_K$ is the cross-sectional area of the control piston. As a result of the displacement of the control piston 2, the pressure port p of the hydraulic valve 3 is connected to the port B. After the electrical energization of the piezoelectric actuator 6 is ended, the control piston 2 is displaced by the compression spring 14 to the left again, with the result that the port p is connected to the port A of the hydraulic valve again.

According to the illustration in FIG. 1, the ratio between the area $A_P$ of the metal plate 5 over the pressure chamber 7 to the cross-sectional area $A_K$ of the control piston 2 is approximately 225. The actuating device 1 according to the invention thus allows a change in length of the piezoelectric actuator 6 of, for example, 60 μm to displace the control piston 2 by approximately 10 mm in a simple manner. It is a major advantage that the "travel amplification" functions purely hydraulically and the actuating device 1 has no moved parts apart from the metal plate 5 and the actuator 6. Thus, the hydraulic valve 3 with the actuating device 1 is very simple, reliable and also has low sensitivity to dirt. The movement of a control piston 2 in relation to a spring 14 is known to a person skilled in the art from numerous valve types, and so a detailed explanation of the right side of the hydraulic valve 3 in FIG. 1 may be omitted. In comparison with the prior art, the moved masses are extremely small, and so a switching time of <2 ms can be achieved without any problems.

Figure 2A:
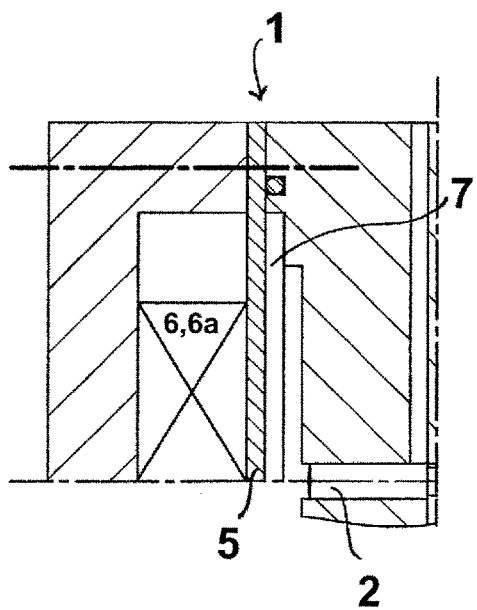
FIG. 2A and FIG. 2B are each illustrations showing the functioning of the actuating device of the hydraulic valve.
Figure 2B:
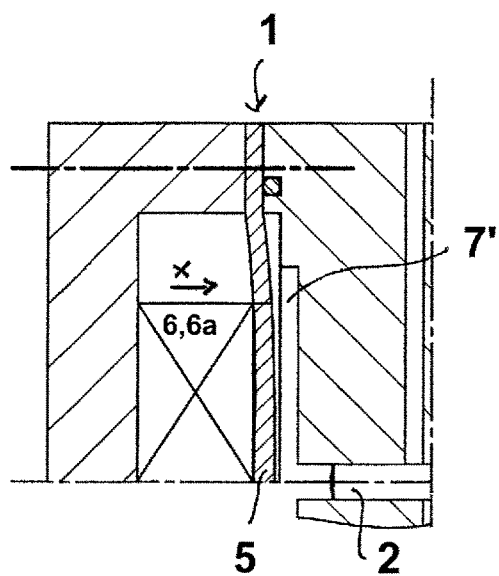

FIGS. 2A and 2B illustrate a quarter-section through a hydraulic valve 3 with another actuating device 1. The embodiment in FIGS. 2, 2A and 2B have, in addition to the actuating device 1 in FIG. 1, a control piston 2 with a crowned formation 10 of the end face. The crowned end formation is seen in FIGS. 2, 3 and 4. Consequently, the so-called "sticking" of the control piston 2 to the metal plate 5 is prevented. Moreover, the central region of the metal plate 5 has a permanent-magnetic holding magnet 8 which is able to hold in an end position the ferromagnetic control piston 2 composed of steel. The radius $r_K$ of the cylindrical control piston 2 and the radius $r_P$ of the circular metal plate 5 over the pressure chamber 7, where $A_K = r_K^2 \cdot \pi$ and $A_P = r_P^2 \cdot \pi$ hold, are furthermore illustrated. The metal plate 5 has a rounding r between the thicker and thinner parts, which increases the operational stability of the metal plate 5.

In FIGS. 2a and 2b, the functioning of the hydraulic valve according to the invention with the actuating device 1 is illustrated in a simplified manner. In FIG. 2a, the piezo 6 is in the rest state, the metal plate 5 is not bent and also the control piston 2 is in an initial position. In FIG. 2b,] in contrast, the piezo 6 has extended in the axial direction x and has caused the metal plate 5 to bend. The bending of the metal plate causes the pressure p in the pressure chamber 7' to increase, such that the control piston 2 is displaced to the right as a result of the pushing-away. After a short time, the pressure chambers 7 and 7' are of equal size, with the result that the control piston 2 is situated further to the right in FIG. 2b than in FIG. 2a.

Figure 3A:
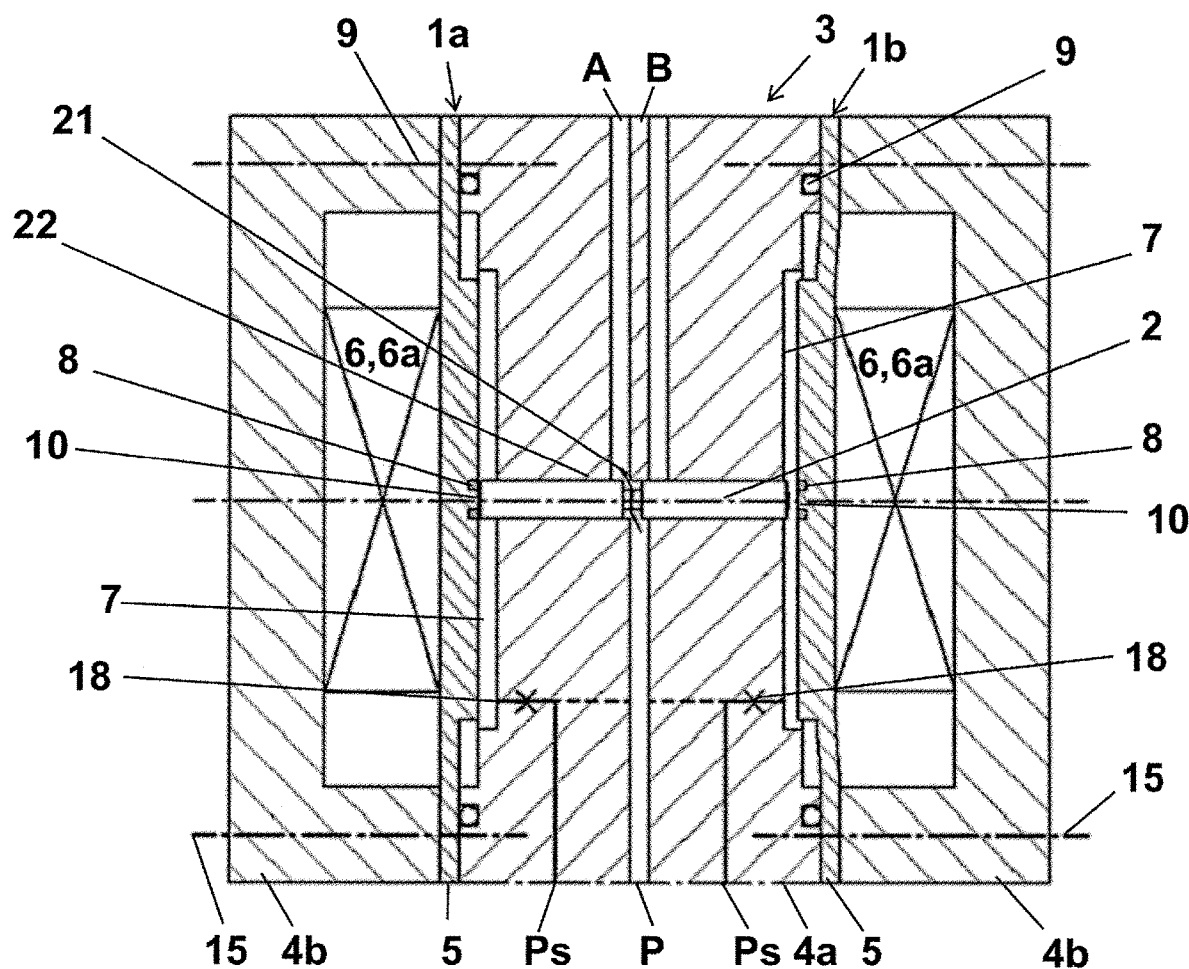
FIG. 3 shows a longitudinal section through a hydraulic valve with two actuating elements and illustrates the hydraulic valve in an inactive condition, FIG. 3A and FIG. 3B each show a longitudinal section through a hydraulic valve with two actuating devices, and each illustrates connection of the valve to a respective port.
FIG. 3C shows a fragment of the valve including the piston of the valve of FIG. 3.
Figure 3B:
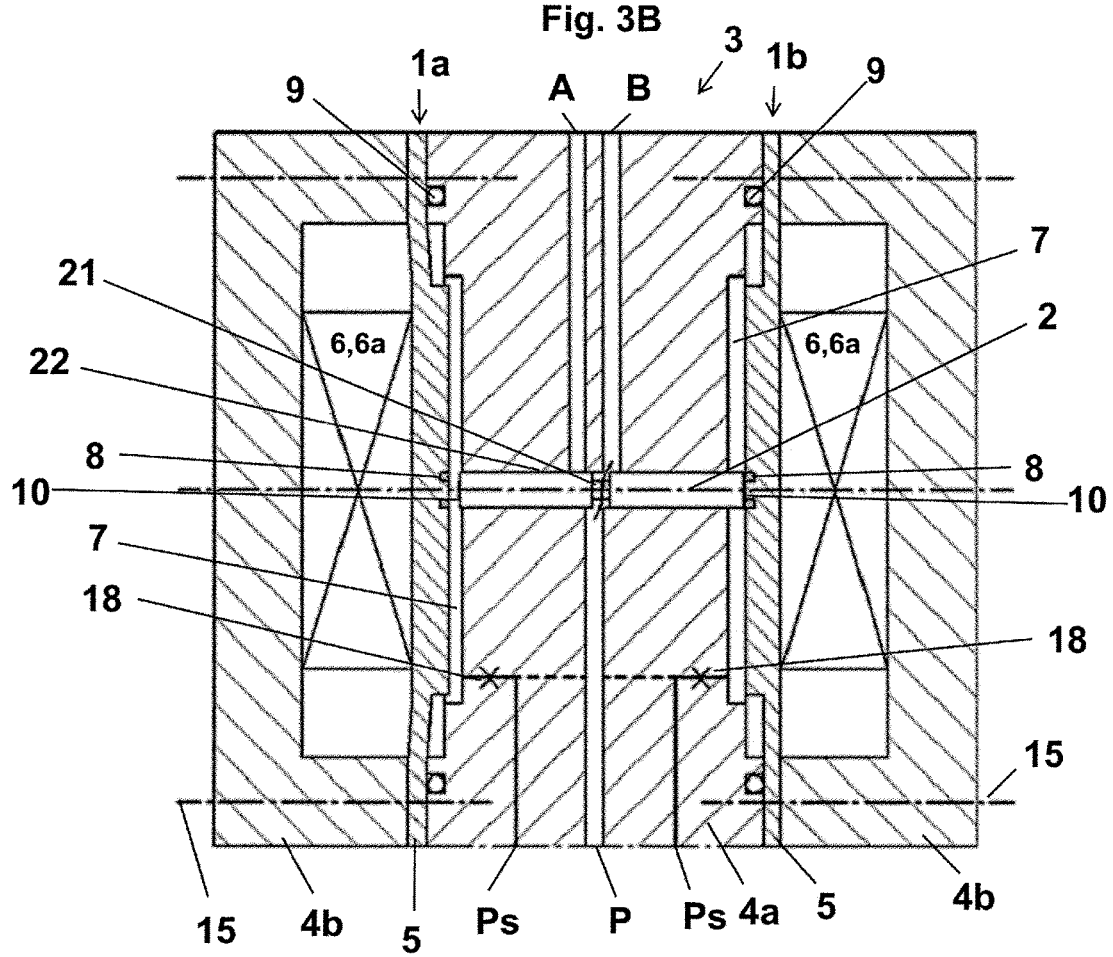
Figure 4:
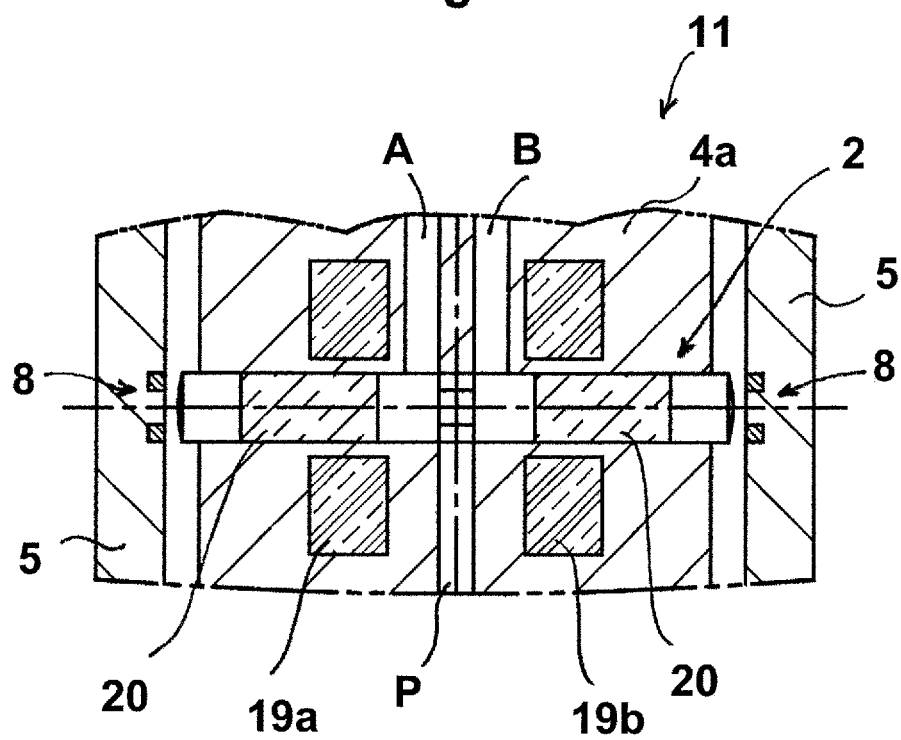
FIG. 4 is a schematic illustration showing the coils of a travel measurement device for the control piston of a hydraulic valve.

FIGS. 3A and 3B show a schematic longitudinal section through a non-continuous 3/2-way hydraulic valve 3 with two actuating devices 1a, 1b.

Figure 3C:
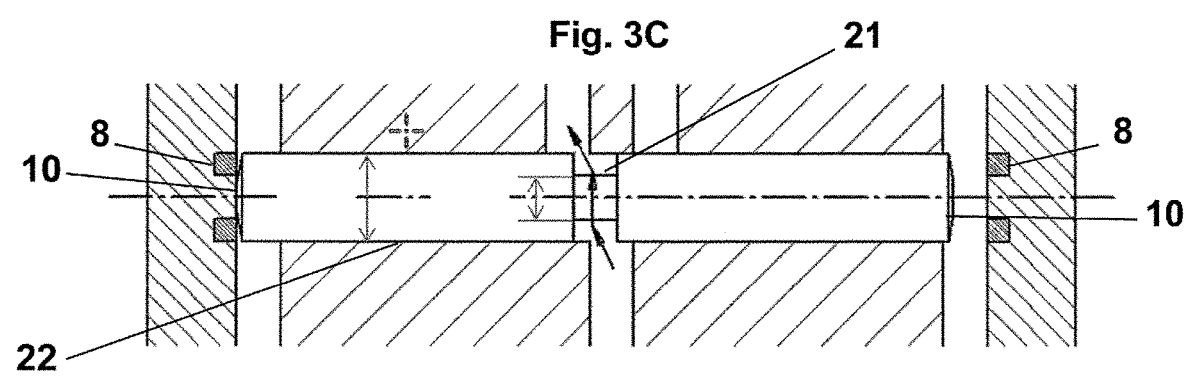

FIGS. 3A, 3B and 3C illustrate a centrally located recess 21 in the piston 2, so located and of an axial width that axial shifting of the piston connects the port p with one or the other of ports A and B. (Other Figures suggest the presence of the recess by two axial lines).

In FIG. 3, the valve and the actuating devices 1a and 1b are in a neutral or inoperative position in which the port p is blocked by the housing section above it and there is no connection of port p to either of ports A or B.

The two actuating devices 1a and 1b are symmetrical, essentially mirror images in their functional aspects disclosed herein. Operation of the valve for connecting port p to one or the other of ports A or B is illustrated in FIGS. 3A and 3B.

The left side activating device 1a has a bent plate 5, as in FIGS. 2B and 3B, which increases pressure in the pressure chamber 7 at the left side device. That pressure moves the piston 2 to the right to create a pathway between ports p and B. In FIG. 3A, the right side activating device 1b has a bent plate 5 which increases pressure in that pressure chamber 7 at the right side device. That pressure moves the piston to the left to create a pathway between ports p and A. The structural design of each of the actuating devices 1a, 1b is very similar to the design in FIGS. 2 and 3, but the control piston 2 is acted on by the two actuating devices 1a and 1b and is held in the respective end positions by the two holding magnets 8. In this way, an extremely quick switching valve is created. In particular during the quick-switching operation of the hydraulic valve 3, to ensure complete filling of both of the pressure chambers 7 at all times, the pressure chambers 7 are connected via a line to a control-pressure port $p_S$ which compensates for any leakage from the pressure chamber 7 via a narrow orifice or throttle 18. Alternatively, as illustrated by dashed lines, it is also possible for branch lines to lead from the pressure port p to the pressure chambers 7.

The following describes an example of use of the valve as shown in FIGS. 3A and 3B. It is non-limiting. The pressure port p is pressurized, e.g. by means of a hydraulic pump. Also, the areas connected to the pressure port p are pressurized. In FIG. 3A, the pressure from the pressure port p is transmitted via the recess 21 in the piston 2, to the consumer port A, and in FIG. 3B, to the consumer port B. The consumer ports A or B may e.g., be the lines to and from a hydraulic motor. For example, if the consumer port A of the hydraulic motor is pressurized, the motor rotates in a first direction. If the consumer port B of the hydraulic motor is pressurized, the motor rotates in a second reverse direction.

There is a cylindrical passage, cylinder or bore 22 in the housing for guiding the piston for axial displacement between its end positions at the pressure chambers.

FIG. 3C illustrates recess 21 in the piston located between the two adjacent cylindrical regions of the piston. The example illustrated shows the recess 21 as annular, having a diameter D1 which is smaller than diameter D2 of the adjacent cylindrical regions. This defines the passage through the recess and past the piston in the cylinder. The recess is of such axial direction length that the recess in the piston enables connection with a then selected one of ports A and B, while the piston surfaces beyond both sides of the recess blocks connection with the other of ports B or A and port p. The recess is at the axial center of the piston consistent with the left-right symmetry. Any pathway across the cylinder or bore 22 and to port p and one of ports A and B may perform like the recess does.

FIG. 4 schematically shows the coils of a travel measurement system 11 for determining the actual position $s_{Ist}$ of the control piston 2. The control piston 2 is magnetic (for example composed of steel with a ferritic structure), but also has at least one non-magnetic part 20. The two coils 19a, 19b which form a differential inductor. This makes it possible for the position $s_{Ist}$ of the control piston 2 to be determined by evaluation electronics, not illustrated, for inductive travel transducers (see for example FIG. 7). Evaluation electronics for inductive travel transducers are known to a person skilled in the art (see for example http://www.lvdt.de).

Figure 5:
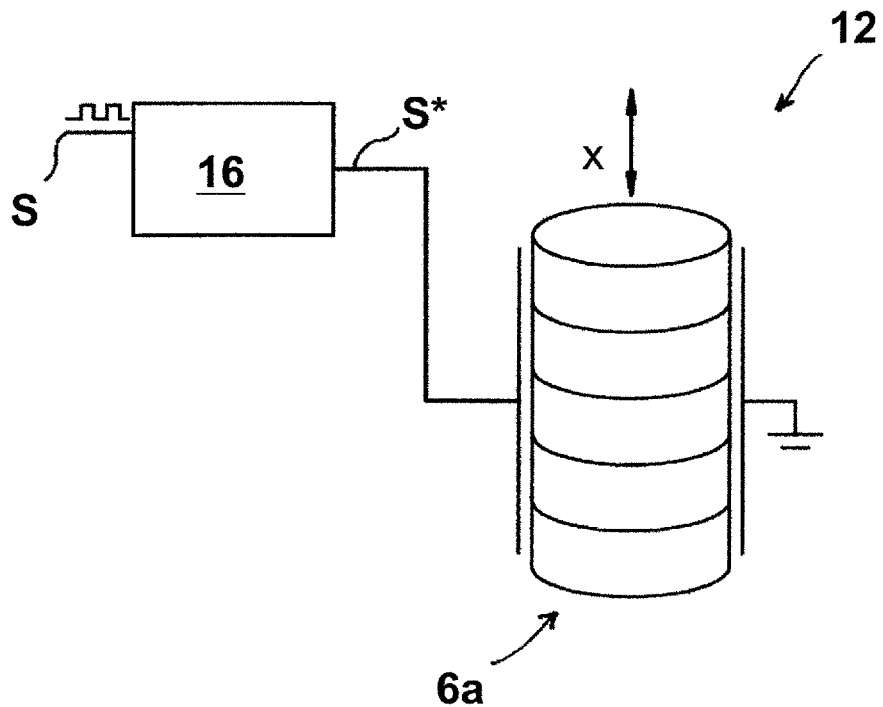
FIG. 5 is an illustration showing the actuation of a piezoelectric actuator.

FIG. 5 schematically shows a control system 12 for a piezoelectric actuator 6, in the form of a piezo stack 6a, of an actuating device 1. The control signal S, simply pulses in this case, is amplified according to the signal form by the amplifier 16, and the amplified control signal S* is supplied as a voltage signal to the piezo stack 6a. The piezo stack 6a expands in the axial direction x in a manner dependent on the control signal S and bends a metal plate 5 (not illustrated here) of the actuating device 1, which leads to displacement of a control piston 2.

Figure 6:
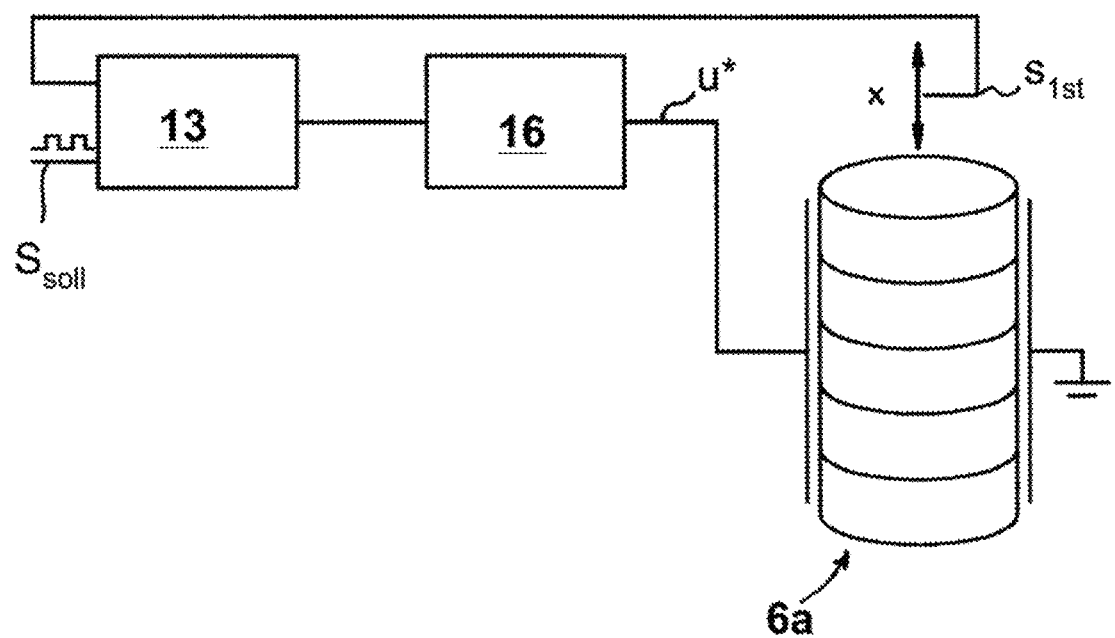
FIG. 6 is an illustration showing the regulation of the axial expansion of a piezoelectric actuator.

FIG. 6 schematically shows regulation for a piezo actuator 6, which is in the form of a piezo stack 6a, of an actuating device 1. The target signal $s_{Soll}$ again in the form of pulses for the expansion of the piezo actuator 6 here is supplied to a regulator 13, which calculates a manipulated variable u in dependence on the difference between the actual expansion $s_{Ist}$ of the piezo actuator 6 and the target signal $s_{Soll}$. The manipulated variable u is amplified by the amplifier 16, and the amplified signal u* is supplied as a voltage signal to the piezo stack 6a. FIG. 6 thus shows simple position regulation for the expansion of the piezo actuator 6.

FIG. 7 schematically shows position regulation for the position of a control piston 2 in a hydraulic valve 3 with two actuating devices 1a, 1b. The position $s_{Ist}$ of the control piston 2 is determined via the two coils of the travel measurement device 11 (see FIG. 4 for design). The actual position $s_{Ist}$ of the control piston and the target position $s_{Soll}$ thereof are supplied to a regulator 13, which calculates two manipulated variables $u_1$, $u_2$ in dependence on the difference between $s_{Soll}$ and $s_{Ist}$. The manipulated variables are amplified by the amplifier 16, and the amplified signals $u_1^*$, $u_2^*$ are supplied as voltage signals to the piezo stacks 6a of the two actuating devices 1a, 1b. FIG. 7 thus indicates simple regulation for the position of the control piston 2 of a hydraulic valve 3 by means of two actuating devices 1a, 1b.

FIG. 8 shows a half-section through two variants of an actuating device 1, which are respectively indicated above and below the horizontal axis of symmetry. In order to reduce the necessary force for the piezoelectric actuator 6 to bend the metal plate 5, the metal plate 5 is mounted in an articulated manner in both variants and the actuator is of "wet" design. The bottom variant of the actuating device 1 is not designed according to the invention since the metal plate 5 is not fixed to the housing 4a, 4b in a stationary manner.

In the above variant, the metal plate 5 bears on in each case one elevation in the valve block 4a and in the cover 4b and is sealed off via two elastic seals 9. Moreover, the pressure chamber 7 and the chamber in which the piezoelectric actuator 6 or the piezo stack 6a is situated are connected via multiple lines with orifices or throttles 18 to a control-pressure port $p_S$. The static pressure on the left and the right of the metal plate 5 is thereby equalized, with the result that the metal plate 5 is relieved of load. The bending of the metal plate 5 by the piezoelectric actuator 6 or the piezo stack 6a in turn leads to an increase in pressure in the respective pressure chamber 7, which displaces the control piston 2. In the bottom variant, the metal plate bears on a stiff seal 9, this likewise corresponding to an articulated mounting of the metal plate 5.

Even though the invention has been illustrated and described in more detail by way of the preferred exemplary embodiments, the invention is not restricted by the examples disclosed, and other variations may be derived therefrom by a person skilled in the art without departing from the scope of protection of the invention.

LIST OF REFERENCE SIGNS 1, 1a, 1b Actuating device
2 Control piston
3 Hydraulic valve
4 Housing
4a Valve block
4b Cover
5 Metal plate
6 Piezoelectric actuator
6a Piezo stack
7, 7' Pressure chamber
8 Holding magnet
9 Seal
10 Crowned formation
11 Travel measurement system
12 Control system
13 Regulator
14 Spring
15 Screw connection
16 Amplifier
18 Orifice
19a, 19b Coil
20 Non-magnetic part of the control piston
21 Piston recess
22 Cylinder/bore for piston
A Consumer port A of the hydraulic valve
B Consumer port B of the hydraulic valve
p Pressure port p of the hydraulic valve
$p_S$ Control-pressure port of the hydraulic valve
r Radius
$r_K$ Radius of the control piston
$r_P$ Radius of the metal plate over the pressure chamber
S Control signal
S* Amplified control signal
$s_{Ist}$ Actual position
$s_{Soll}$ Target position
u, $u_1$, $u_2$ Manipulated variable
u*, $u_1^*$, $u_2^*$ Amplified manipulated variable signal
x Axial direction

The invention claimed is:
1. A hydraulic valve comprising:
a control piston;
an actuating device for displacing the control piston;
the hydraulic valve comprises:
a housing;
the control piston has a cross-sectional area $A_K$, and the control piston is configured to be displaced in the housing in an axial direction of the control piston, and the control piston is configured such that a throughflow of a pressurized liquid may be set by the displacement of the control piston; and
the actuating device includes:
a flexurally rigid metal plate, having an outer peripheral region of the metal plate fixed to the housing in a stationary manner, a central region of the metal plate being thicker than the outer peripheral region of the metal plate;

a curved surface located between the central region of the metal plate and the outer peripheral region of the metal plate;

a piezoelectric actuator operable into contact with the metal plate to bend a central region of the metal plate; and a pressure chamber configured to be filled with the pressurized liquid during operation of the valve;

wherein the pressure chamber is delimited by the housing, the metal plate and the control piston;

wherein the metal plate is configured to seal off the pressure chamber and the pressure chamber acts on the control piston;

wherein an area $A_P$ of the metal plate over the pressure chamber is greater than a cross-sectional area $A_K$ of the control piston; and wherein the piston has an end face opposite the metal plate, the end face having a convex crowned formation to prevent sticking of the control piston to the metal plate.

2. The hydraulic valve as claimed in claim 1, wherein an area $A_P$ of the metal plate over the pressure chamber is at least four times greater than a cross-sectional area $A_K$ of the control piston where the piston is at the metal plate.

3. The hydraulic valve as claimed in claim 1, further comprising the piezoelectric actuator has a travel measurement system configured for measuring an expansion of the piezoelectric actuator in the axial direction of the control piston.

4. The hydraulic valve as claimed in claim 1, further comprising the metal plate consists of steel.

5. The hydraulic valve as claimed in claim 1, further comprising the metal plate is round.

6. The hydraulic valve as claimed in claim 1, further comprising a fluid-tight seal between the peripheral region of the metal plate and the housing.

7. The hydraulic valve as claimed in claim 1, further comprising the pressure chamber is configured to be supplied with the pressurized liquid under pressure by a line having an orifice.

8. The hydraulic valve as claimed in claim 1, further comprising the control piston consists of steel.

9. The hydraulic valve as claimed in claim 1, further comprising the housing comprises a valve block and a cover, and the cover is detachably connected to the valve block and the piezoelectric actuator is supported against the cover.

10. The hydraulic valve as claimed in claim 9, further comprising the valve block has a travel measurement system located and configured for measuring a position of the control piston.

11. The hydraulic valve as claimed in claim 10, further comprising an amplifier amplifying a control signal (S) and electrically energizes the piezoelectric actuator by the amplified control signal (S*).

12. The hydraulic valve as claimed in claim 11, further comprising a regulator configured to calculate a manipulated variable signal u in dependence on a difference between a target position and an actual position of the control piston, and the amplifier is configured to electrically energize at least one of the piezoelectric actuator by the amplified manipulated variable signal.

13. The hydraulic valve as claimed in claim 1, further comprising two of the actuating devices; and the control piston having two ends, each being actuated by a respective one of the actuating devices.

14. The hydraulic valve as claimed in claim 1, further comprising:

ports in the housing defining a pathway in the housing for pressurized liquid to pass the piston and out of or into the ports which are served by the valve; at least two of the ports are selectable by the piston; one or the other of the at least two of the selectable ports is selectively served by the pathway at one time, and the at least two selectable ports being placed in the housing such that axial displacement of the piston in the housing connects a selected one of the at least two selectable ports into the pathway; and a third one of the ports being in the pathway to complete passage of liquid past the piston and the pathway.

15. The hydraulic valve as claimed in claim 1, further comprising a cylinder in the housing through which the piston is displaced;

the at least two selectable ports and the third port each communicating into the cylinder at respective locations;

the piston having a recess therein which is part of the pathway, the recess is of a smaller diameter than a diameter of the piston adjacent the recess, the recess being of an axial length such that during displacement of the piston, the recess communicates with one of the two selectable ports and not with the other selectable port; and the third port also communicating with the recess during the displacement of the piston while the recess is communicating with the one or the other of the two selectable ports.

16. The hydraulic valve as claimed in claim 1, further comprising the recess in the piston having a first diameter which is less than a second diameter of the cylinder through which the piston is displaced.

17. A hydraulic valve comprising:

a control piston;

an actuating device for displacing the control piston;

the hydraulic valve comprises:

a housing;

the control piston has a cross-sectional area $A_K$, and the control piston is configured to be displaced in the housing in an axial direction of the control piston, and the control piston is configured such that a throughflow of a pressurized liquid may be set by the displacement of the control piston; and the actuating device includes:

a flexurally rigid metal plate, having an outer peripheral region of the metal plate fixed to the housing in a stationary manner;

a piezoelectric actuator operable into contact with the metal plate to bend a central region of the metal plate; and a pressure chamber configured to be filled with the pressurized liquid during operation of the valve;

wherein the pressure chamber is delimited by the housing, the metal plate and the control piston;

wherein the metal plate is configured to seal off the pressure chamber and the pressure chamber acts on the control piston;

wherein an area $A_P$ of the metal plate over the pressure chamber is greater than a cross-sectional area $A_K$ of the control piston;

wherein the piston has an end face opposite the metal plate, the end face having a convex crowned formation to prevent sticking of the control piston to the metal plate, and wherein the piston is comprised of a ferromagnetic metal, wherein the piston is actuated purely hydraulically, and further comprising a holding magnet located at a central region of the metal plate opposite the end face of the piston to hold the piston in an end position.

18. A hydraulic valve comprising:
a control piston;
an actuating device for displacing the control piston;
the hydraulic valve comprises:
- a housing;
- the control piston has a cross-sectional area AK, and the control piston is configured to be displaced in the housing in an axial direction of the control piston, and the control piston is configured such that a throughflow of a pressurized liquid may be set by the displacement of the control piston; and the actuating device includes:
- a flexurally rigid metal plate, having an outer peripheral region of the metal plate fixed to the housing in a stationary manner, a central region of the metal plate being thicker than the outer peripheral region of the metal plate;
- a peripheral wall located between the central region of the metal plate and the peripheral region of the metal plate, the peripheral wall being adjacent a flat surface that spans across the central region of the metal plate;
- a piezoelectric actuator operable into contact with the metal plate to bend a central region of the metal plate; and
- a recessed pressure chamber configured to be filled with the pressurized liquid during operation of the valve, and having a bottom, flat surface opposite the flat surface of the central region of the metal plate, the recessed pressure chamber being sized and shaped to receive the central region of the metal plate therein;

wherein the pressure chamber is delimited by the housing, the metal plate and the control piston;

wherein the metal plate is configured to seal off the pressure chamber and the pressure chamber acts on the control piston;

wherein an area AP of the metal plate over the pressure chamber is greater than a cross-sectional area AK of the control piston; and wherein the piston has an end face opposite the metal plate, the end face having a convex crowned formation to prevent sticking of the control piston to the metal plate.

* * * * *